United States Patent
Sühnel et al.

(10) Patent No.: US 10,281,048 B2
(45) Date of Patent: May 7, 2019

(54) THREE-WAY FLAP VALVE WITH CURVED VALVE FLAP

(71) Applicant: Eberspächer Exhaust Technology GmbH & Co. KG, Neunkirchen (DE)

(72) Inventors: Frank Sühnel, Ebersbach/Fils (DE); Eduard-Horst Kast, Esslingen (DE); Markus Birgler, Wernau (DE); Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/142,543

(22) Filed: Apr. 29, 2016

(65) Prior Publication Data

US 2016/0319946 A1    Nov. 3, 2016

(30) Foreign Application Priority Data

May 1, 2015    (DE) .................. 10 2015 106 835

(51) Int. Cl.
  *F16K 11/052*    (2006.01)
  *F01N 13/08*    (2010.01)
  *F16K 11/087*    (2006.01)

(52) U.S. Cl.
  CPC .......... *F16K 11/0525* (2013.01); *F01N 13/08* (2013.01); *F16K 11/0873* (2013.01)

(58) Field of Classification Search
  CPC .. F16K 11/0525; F16K 11/0873; F01N 13/08; Y10T 137/87812; Y10T 137/8782
  USPC .................................................. 137/875, 876
  See application file for complete search history.

(56) References Cited

U.S. PATENT DOCUMENTS

| | | | |
|---|---|---|---|
| 952,691 | A | 3/1910 | Talmage |
| 3,270,775 | A | 9/1966 | Alderson |
| 4,597,415 | A | 7/1986 | Gieseke |
| 4,921,598 | A | 5/1990 | Desch |
| 5,988,220 | A | 11/1999 | Sakaki |
| 2002/0189692 | A1 | 12/2002 | Sato et al. |
| 2003/0005966 | A1 | 1/2003 | Johann |
| 2005/0233687 | A1 | 10/2005 | Wachter |
| 2006/0169337 | A1 | 8/2006 | Lopez |
| 2009/0208795 | A1 | 8/2009 | Skala et al. |
| 2013/0228247 | A1 | 9/2013 | Baumann |
| 2014/0053549 | A1 | 2/2014 | Scholt et al. |

FOREIGN PATENT DOCUMENTS

| | | |
|---|---|---|
| DE | 1 204 476 B | 11/1965 |
| DE | 12 04 476 B | 11/1965 |
| DE | 1 213 683 B | 3/1966 |
| DE | 38 32 598 A1 | 4/1990 |
| DE | 198 54 795 C1 | 4/2000 |
| DE | 103 39 623 A1 | 3/2005 |

(Continued)

*Primary Examiner* — Michael R Reid
(74) *Attorney, Agent, or Firm* — McGlew and Tuttle, P.C.

(57) ABSTRACT

A three-way flap valve (4) includes an inlet (1), a first outlet (2), a second outlet (3), and a valve flap (5). The valve flap (5) can be moved between at least a first position and a second position. In the first position of the valve flap (5), fluid flowing in through the inlet (1) is directed to the first outlet (2). In the second position of the valve flap (5), fluid flowing in through the inlet (1) is directed to the second outlet (3). A surface (51) of the valve flap (5) circumscribed by an outer edge (53) includes at least a first surface section (A1), where the surface of the valve flap (5) has a curvature.

20 Claims, 7 Drawing Sheets

(56) References Cited

FOREIGN PATENT DOCUMENTS

| | | |
|---|---|---|
| DE | 10 2006 032584 A1 | 1/2008 |
| DE | 10 2009 008445 A1 | 9/2009 |
| DE | 10 2010 023 412 B4 | 5/2012 |
| DE | 10 2011 016 630 A1 | 10/2012 |
| DE | 10 2012 107 839 A1 | 2/2014 |
| EP | 1 510 739 A1 | 3/2005 |
| FR | 1 343 429 A | 11/1963 |
| GB | 733 931 A | 7/1955 |
| JP | S62-82469 U | 5/1987 |
| JP | S62-194253 U | 12/1987 |
| WO | 2010/034450 A1 | 4/2010 |

THREE-WAY FLAP VALVE WITH CURVED VALVE FLAP

CROSS REFERENCE TO RELATED APPLICATIONS

This present application claims priority of Patent Application No. 10 2015 106 835.4, filed May 1, 2015 in Germany, the entire contents of which are incorporated by reference herein.

FIELD

The present application relates to a three-way flap valve. More particularly, the present application relates to a three-way exhaust flap valve particularly applicable to selectively connect and disconnect a heat energy recovery mechanism in specific operational conditions of an internal combustion engine to and from an exhaust gas stream.

BACKGROUND

Three-way flap valves are also referred to as three-way butterfly valves. Three-way flap valves are characterized by the number of inlets and outlets being precisely three.

The heat energy recovery mechanism may, for instance, be a latent heat accumulator, an energy generator operating in accordance with the Rankine cycle, a Schukey engine operating in an Organic Rankine Cycle (OCR process), or just a heat exchanger for heating a coolant.

The exhaust gas treatment for internal combustion engines is usually configured from passive systems that are all in all passed through by the exhaust gas during all operational conditions. When passing through the system, the exhaust gas flow suffers a certain resistance that reduces the overall efficiency of the system. To reduce emissions and exhaust noise under operating conditions with lower partial load such as in normal traffic situations, switchable systems with position members are used allowing to seal or disconnect parts of the exhaust system and to use only portions of it.

From DE 10 2012 107 839 A1 a four-way exhaust flap is known that serves that purpose. A drawback of this known exhaust flap is its high flow resistance.

Further, it is known to charge a latent heat accumulator using the engine heat of a motor vehicle and to release the energy stored in the latent heat accumulator on cold starts.

SUMMARY

Embodiments provide a three-way flap valve enabling a selective connection to sections of an exhaust system in a cost effective, simple and robust manner that further exhibits a lower flow resistance than known exhaust flaps.

Embodiments of a three-way flap valve comprise an inlet, a first outlet, a second outlet, and a valve flap. The valve flap can be moved between at least a first position and a second position. In the first position of the valve flap, the major part of a fluid flowing in from the inlet is passed on to the first outlet. In the second position of the valve flap, the major part of a fluid flowing in from the inlet is passed on to the second outlet. "Major part" hereby means that more than 90 percent by volume of the fluid supplied to the inlet of the three-way valve are passed on to the respective outlet. Hereby, the valve flap is not planar. Instead, a surface of the valve flap defined by an outer edge comprises at least one first surface section curved such that not all points of the valve flap are located within a plane.

The curvature of the valve flap enables a provision of a larger flow cross-section for the fluid inside the three-way flap valve as compared to conventional three-way flap valves having a planar valve flap. This results in a lower flow resistance for the three-way flap valve as compared to conventional three-way flap valves. The curvature may hereby follow one direction or several different directions.

According to an embodiment, the valve flap comprises a first surface circumscribed by the outer edge and facing towards the inlet, the first surface being concave in at least the first surface section.

According to an embodiment, the valve flap comprises a first surface circumscribed by the outer edge and facing towards the inlet, the first surface corresponding, in at least the first surface section, to an inner side surface of a cylinder segment or to an inner surface of a spherical segment.

The valve flap thus comprises a belly facing away from the inlet such that a volume spanned by the outer edge of the valve flap opens to the inlet.

According to an embodiment, the valve flap comprises a second surface circumscribed by the outer edge and facing away from the inlet, the second surface being spaced apart from the first surface and being convex in at least the first surface section.

According to an embodiment, the valve flap comprises a second surface circumscribed by the outer edge and facing away from the inlet, the second surface being spaced apart from the first surface and corresponding, in at least the first surface section, to an outer side surface of a cylinder segment or corresponding, in at least the first surface section, to an outer surface of a spherical segment.

According to an embodiment, the distance between the first and the second surface is constant along the whole extent of the valve flap, resulting in a constant thickness of the valve flap.

According to an embodiment, the valve flap comprises a first surface circumscribed by the outer edge and facing towards the inlet, and a second surface circumscribed by the outer edge and facing away from the inlet, with the second surface being spaced apart from the first surface. A straight line segment connecting two points on the outer edge is hereby at least 5% or at least 10%, or at least 20% shorter than the shortest line segment in the first surface connecting the two points.

According to an embodiment, the curvature of the valve flap in the first surface section has a radius of curvature of less than 1.00 m, or a radius of curvature of less than 0.50 m, or a radius of curvature of less than 0.25 m.

According to an embodiment, the valve flap comprises a second surface section and a third surface section. The first surface section is hereby located between the second and the third surface section. Further, the curvature of the valve flap in the second and third surface section is different to the curvature of the first surface section or equals zero.

The valve flap may thus have different curvatures in different sections. The transition between the different curvatures may be continuous or discontinuous. According to an embodiment, the surface of the valve flap facing towards the inlet of the valve flap is, however, continuous.

According to an embodiment, the shape of the valve flap in the first surface segment corresponds to a spherical segment, and the shape of the valve flap in each of the second and third surface segments corresponds to a truncated cone segment.

According to an alternative embodiment, the shape of the valve flap in the first surface segment corresponds to a cylinder segment, and the valve flap is not curved in any of the second and third surface segments.

According to an embodiment, the valve flap is adapted for being rotated around a pivot axis. The pivot axis may be a virtual and not necessarily a physical pivot axis. In this case, the first surface section extends around a first angle of between 50° and 130° with respect to the pivot axis, and the second and third surface sections each extend around a second angle, the second angle being equal to half of the difference between 180° and the first angle.

According to an embodiment, the first surface section extends between 50° and 130° with respect to the pivot axis, and the second and third surface sections each extend between 65° and 25°.

According to an alternative embodiment, the first surface section extends between 60° and 120° with respect to the pivot axis, and the second and third surface sections each extend between 60° and 30°.

According to an alternative embodiment, the first surface section extends around 76° with respect to the pivot axis, and the second and third surface sections each extend around 52°.

According to an alternative embodiment, the first surface section extends around 90° with respect to the pivot axis, and the second and third surface sections each extend around 45°.

According to an alternative embodiment, the first surface section extends around 120° with respect to the pivot axis, and the second and third surface sections each extend around 30°.

According to an embodiment, the three-way flap valve further comprises a valve body, with the valve flap being positioned inside the valve body and the inlet and the first and second outlet being formed in the valve body. The valve body thus defines the volume enclosed by the three-way flap valve.

According to an embodiment, the valve body is made from metal or plastics.

According to an embodiment, the volume enclosed by the valve body is spherical or cubical. The valve body may for instance confine a cuboid-like or ball-shaped internal volume. Alternatively, the valve body may for instance also confine an internal volume composed of two or three cylinders overlapping each other to a certain extent.

According to an embodiment, the valve body comprises in its interior sealing stops for the valve flap.

According to an embodiment, a pivot axis (pivot pin) of the valve flap passes straight through the valve body. Further, the pivot axis (pivot pin) carries a curved baffle plate. The pivot axis (pivot pin) may for instance be rod-shaped. A respective continuous shaft increases the stability of the three-way flap valve, with its tolerance specifications being narrowed as compared to two different bearings.

The baffle plate serves to spread a fluid flow across the entire cross section of the three-way flap valve and to prevent banking-ups. The baffle plate further assists in keeping down turbulence caused by the pivot axis. Since the baffle plate is attached to the pivot axis, it rotates together with the valve flap upon the valve flap being rotated, and does thus not rotate with respect to the valve flap. This ensures that the orientation of the baffle plate always fits the respective position of the valve flap.

According to an embodiment, the baffle plate comprises a surface facing towards the inlet that is concave.

According to an embodiment, the baffle plate comprises a surface facing towards the inlet, and conforms to an inner side corresponding to an inner side surface of a cylinder segment or to an inner surface of a spherical segment.

The curvature of the baffle plate may correspond to the curvature of the valve flap, or be different. In particular, the curvature of the baffle plate may be bigger than the curvature of the valve flap by a factor, and thus be obtained by scaling the curvature of the valve flap.

According to an alternative embodiment, the pivot axis of the valve flap does not pass through the valve body, with the valve flap rather being supported inside the valve body by separate bearings located at two opposite points. Sacrificing a pivot axis passing through the valve body prevents turbulence and accordingly reduces the flow resistance of the three-way flap valve.

According to an embodiment, the valve flap comprises on a second surface circumscribed by the outer edge and facing away from the inlet, at least one protrusion. The protrusion may be configured to abut on the inside wall of the valve body in at least one position of the valve flap.

In this way, it is possible to limit an abutting of the valve flap on an inside wall of the valve body to a small area thereby enabling the valve flap to have a larger play with respect to the valve body. Further, it is possible to achieve that the valve flap abuts on an inside wall of the valve body in certain positions only.

According to an embodiment, the valve flap comprises on a second surface circumscribed by the outer edge and facing away from the inlet just two protrusions forming an angle of 90° with respect to a pivot axis of the valve flap.

According to an embodiment, the valve flap comprises, on its first surface circumscribed by the outer edge and facing towards the inlet, a thickness corresponding to the protrusion.

According to an embodiment, the valve body comprises a protrusion on its inside wall opposite the inlet, the protrusion being oriented towards the inlet and extending along a pivot axis that enables a pivoting motion of the valve flap, or between two bearings configured to enable a pivoting motion of the valve flap.

In this way, it is possible to limit an abutting of the valve flap on an inside wall of the valve body to a small area thereby enabling the valve flap to have a larger play with respect to the valve body.

According to an embodiment, the fluid guided by the three-way flap valve is exhaust gas supplied from an internal combustion engine to the inlet of the three-way flap valve. In this case, the three-way flap valve is a three-way exhaust gas flap enabling a fluid communication between its inlet and an outlet for the exhaust gas from an internal combustion engine.

According to an embodiment, the curvature of the valve flap does not change its sign within the first surface section.

According to an embodiment, the curvature of the valve flap within the first surface section is continuous.

According to an embodiment, the valve flap comprises a surface in the first surface section that represents a bulged parametric surface in the mathematical sense. According to an alternative embodiment, the valve flap comprises a surface in the first surface section that is curved in the mathematical sense.

According to an embodiment, the valve flap is made from a bend-proof material, and in particular from metal sheet material.

Although the three-way valve described above comprises one inlet and two outlets, it is alternatively also possible to exchange the functionality of the inlets and the outlets. The three-way valve may have three fluid passages that may be two inlets and a single outlet. An inlet may therefore alternatively form an outlet and the two outlets may form two inlets.

According to an embodiment, the first outlet and the second outlet each form an angle of 90° with respect to the inlet, with the first and second outlet forming an angle of 180° with each other. According to an alternative embodiment, the first outlet and the second outlet each form an angle of 60° with the inlet, with the first and second outlet forming an angle of 120° with each other. According to an embodiment, the first outlet, the second outlet, and the inlet are arranged within the same plane. Alternatively, the first outlet, the second outlet and the inlet may also be arranged distributed in space.

Further features of the invention will be apparent from the following description of exemplary embodiments together with the claims and the Figures. In the Figures, equal or similar elements are assigned equal or similar reference signs. It is noted that the invention is not limited to the configurations of the exemplary embodiments described herein, but defined by the scope of the claims enclosed. Embodiments according to the invention may in particular implement individual features in different numbers and combination than the examples described below. In the following description of an exemplary embodiment, reference is made to the enclosed Figures. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
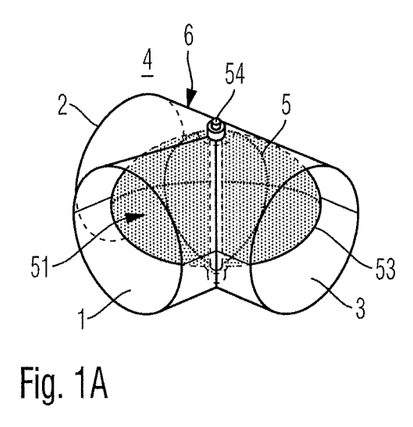
FIG. 1A is a schematic perspective view showing a three-way flap valve according to a first embodiment, with the walls of the three-way flap valve body illustrated transparently.
Figure 1B:
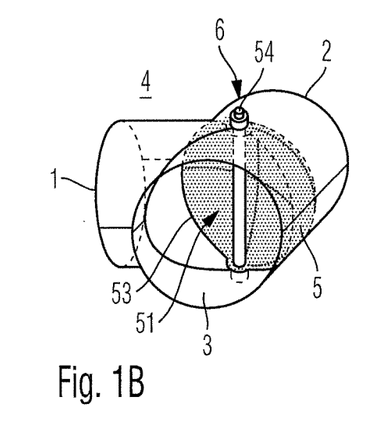
FIG. 1B is a schematic perspective view showing a three-way flap valve according to the first embodiment, with the walls of the three-way flap valve body illustrated transparently.
Figure 1C:
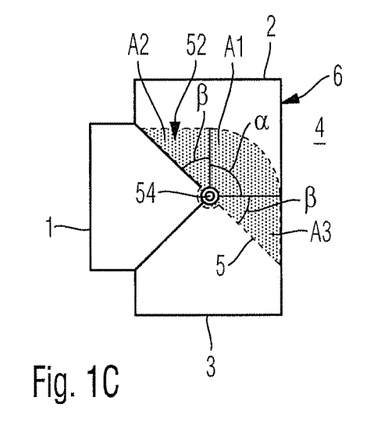
FIG. 1C is a schematic top view showing a three-way flap valve according to the first embodiment, with the walls of the three-way flap valve body illustrated transparently.

Referencing FIGS. 1A, 1B, and 1C, a first embodiment of a three-way flap valve 4 is described below taking a three-way exhaust flap as example.

The three-way exhaust flap comprises a valve body 6 confining an internal volume of the three-way flap valve 4 thus forming the housing of the three-way flap valve 4.

In the embodiment shown, the valve body is formed by two pipes made from sheet steel and arranged to form a T. A first pipe extending straight defines a first outlet 2 and a second outlet 3, the first and second outlets being arranged oppositely thus forming an angle of 180°. A second pipe joined at an angle of 90° to said first pipe defines an inlet 1. The inlet 1 accordingly forms an angle of 90° with each of the first and second outlets 2, 3, and the inlet 1, and the first and second outlets 2, 3 are arranged within the same plane.

In valve body interior, the valve body 6 accommodates a curved valve flap 5 made from a bend-proof sheet material. Hereby, the valve flap 5 can be moved between a first and a second position by means of a pivot axis 54 passing, in the embodiment illustrated, straight through the valve body 4. In the first position, the valve flap 5 guides exhaust gas flowing in through the inlet 1 to the first outlet 2, and in the second position (which is also shown in FIGS. 1A-1C), the valve flap 5 guides exhaust gas flowing in through the inlet 1 to the second outlet 3. The valve flap 5 may also be positioned in between. In the embodiment shown, the pivot axis 54 is supported by two bearings provided outside the valve body 6 on opposite ends of the pivot axis 54. Each of the bearings is configured from a bearing bush, a graphite bushing, and an adjusting screw, and thus forms a plain bearing. In the embodiment shown, the valve flap 5 is controlled from outside. Alternatively, the valve flap 5 may for instance also be arranged to switch automatically in response to back pressure.

Furthermore, the valve flap 5 is curved in such a way that a first surface 51 circumscribed by an outer edge 53 and facing towards the inlet 1 has a curved surface. As can be seen, the curvature of the valve flap 5 shows no change of sign, and the first surface 51 of the valve flap 5 facing towards the inlet 1 is continuous. This does, however, not mean that the curvature of the first surface 51 is constant throughout the whole first surface 51 of the valve flap 5. The valve flap 5 of the embodiment illustrated rather comprises in a first surface section A1 of the first surface 51, the first surface section extending around an angle α of 90° relative to the pivot axis 54, a curvature in two directions orthogonal to one another. In the first surface section A1, the curvature adapts the curvature of a spherical segment. With the valve flap 5 of the embodiment illustrated having a constant material thickness across the whole of its surface, the first surface facing towards the inlet 1 corresponds in the first section A1 to the inner side surface of a spherical segment, and the second surface 52 facing away from the inlet 1 corresponds in the first section A1 to the outer side surface of a spherical segment. In a second and third surface section A2, A3 adjacent to the first surface section A1 and each extending with respect to the pivot axis 54 around an angle β of 45°, the first surface 51 is only curved in one direction. In fact, the first surface 51 of the valve flap 5 adapts the side surface of a truncated cone in each of the second and third surface sections A2, A3. The first surface section A1 is thus disposed between the second and the third surface sections A2, A3, and the curvature of the valve flap 5 in the second and third surface section differs from the curvature in the first surface section.

The curvature of the valve flap 5 results in a line segment connecting two points on its outer edge 53 being shorter by at least 5% than the shortest line segment in the first surface 51 connecting the two points, provided the two points are located on the outer edge 53 opposite to each other with respect to the pivot axis 54.

In the illustrated embodiment, the curvature of the first surface 51 facing towards the inlet 1 is chosen such that in the first, second, and also third sections A1, A2, and A3 a radius of curvature, of the first surface 51 facing towards the inlet 1, in one direction is 25 mm.

It is noted that the present invention is not limited to the above curvature of the valve body. Rather, it is sufficient, when the valve flap has in a first surface section a parametric surface bulged in the mathematical sense or a surface curved in the mathematical sense.

Evidently in the illustrated embodiment, the first surface 51 facing towards the inlet 1 is concave from end to end and the second surface 52, spaced from the first surface 51 by the thickness of the valve flap 5 and facing away from the inlet 1, is accordingly convex from end to end. That is, the bulge of the valve flap 5 is open towards the inlet 1.

The orientation of the valve flap 5 in combination with the curvature results in a bigger open flow cross-section for the exhaust gas passing through the three-way flap valve 4 such that the three-way flap valve 4 has a particularly low flow resistance.

Figure 2A:
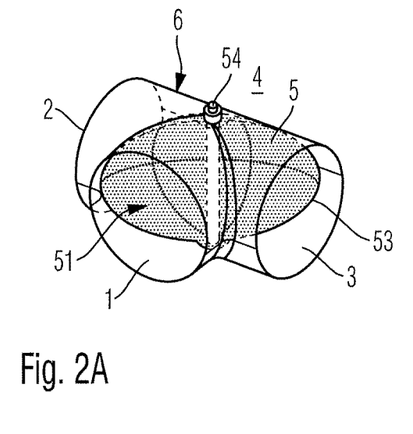
FIG. 2A is a schematic perspective view showing a three-way flap valve according to a second embodiment, with the walls of the three-way flap valve body illustrated transparently.
Figure 2B:
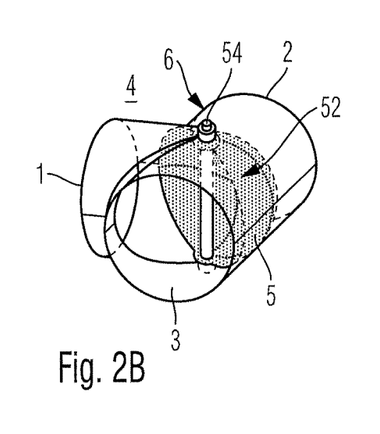
FIG. 2B is a schematic perspective view showing a three-way flap valve according to the second embodiment, with the walls of the three-way flap valve body illustrated transparently.
Figure 2C:
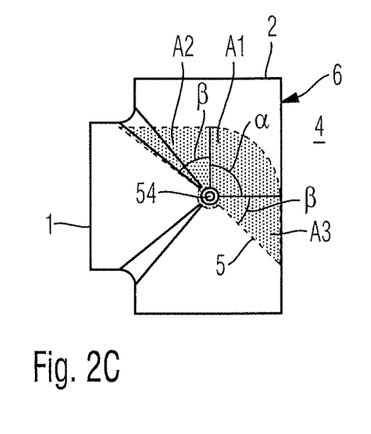
FIG. 2C is a schematic top view showing a three-way flap valve according to the second embodiment, with the walls of the three-way flap valve body illustrated transparently.

Referencing FIGS. 2A, 2B, and 2C, a second embodiment of a three-way flap valve 4 is described below. To avoid any repetition, only the differences to the first embodiment described above are addressed, and for the rest reference is made to the explanations of the first embodiment.

Like in the first embodiment described above, the three-way flap valve 4 comprises a valve body 6, having all in all a T-like shape, two, first and second, outlets 2, 3 located opposite each other, and an inlet 1 being rotated by 90° with respect to these first and second outlets 2, 3. The valve body 6 is in this embodiment, however, not formed of two pipes arranged in a T shape, but formed of two semi-monocoques made from sheet metal. Further, the edges at the transition region between the inlet 1 and the first and second outlets 2, 3 are rounded to prevent turbulence in the exhaust gas.

The second embodiment differs from the above first embodiment further in that the second and third sections A2, A3 each extend around an enlarged angle β of 48°, while the first section A1 located in between still extends around an angle α of 90°. The angles α and β refer again to the pivot axis 54. Together with the configuration of the second and third sections A2, A3 being longer than in the first embodiment, it is thus possible to achieve that the valve flap 5 realizes a good seal effect for a fluid passing through the valve when being in its extreme positions, despite the rounding of the edges between the first and second outlets.

In the following, a third embodiment of a three-way flap valve 4 is described referencing FIGS. 3A, 3B, and 3C. To avoid any repetition, it is again referred to the explanations of the first embodiment, and for the rest only differences are addressed.

Figure 3A:
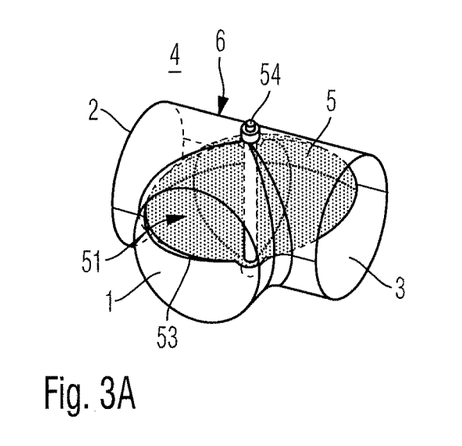
FIG. 3A is a schematic perspective view showing a three-way flap valve according to a third embodiment, with the walls of the three-way flap valve body illustrated transparently.
Figure 3B:
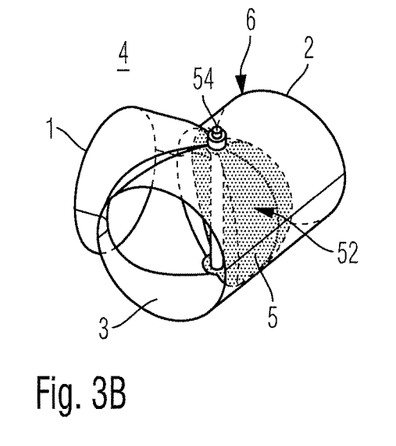
FIG. 3B is a schematic perspective view showing a three-way flap valve according to the third embodiment, with the walls of the three-way flap valve body illustrated transparently.
Figure 3C:
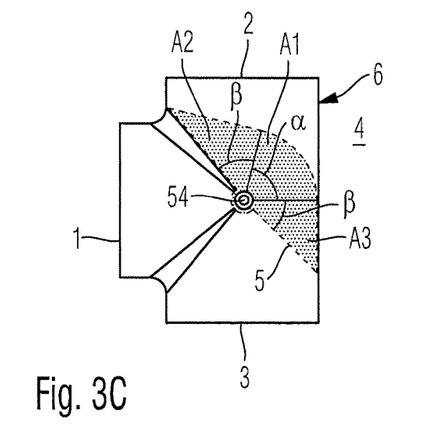
FIG. 3C is a schematic top view showing a three-way flap valve according to the third embodiment, with the walls of the three-way flap valve body illustrated transparently.

The third embodiment shown in FIGS. 3A to 3C differs from the first embodiment described above in that each of the edges at the transition between the inlet 1 and the first and second outlets 2, 3 comprises a chamfer. Further in the third embodiment, the first section A1 of the valve flap 5 extends relative to the pivot axis 54 around a smaller angle α of 76°. Moreover, the second and third surface sections A2, A3, between which the first surface section A1 is located, each extends with regard to the pivot axis 54 around a larger angle β of 52°. Because of this it is also possible to ensure that the valve flap 5 realizes a good seal effect for fluid passing through the valve when being in its extreme positions, despite the chamfers in the edges between the inlet 1 and the first and second outlets 2, 3.

Figure 4A:
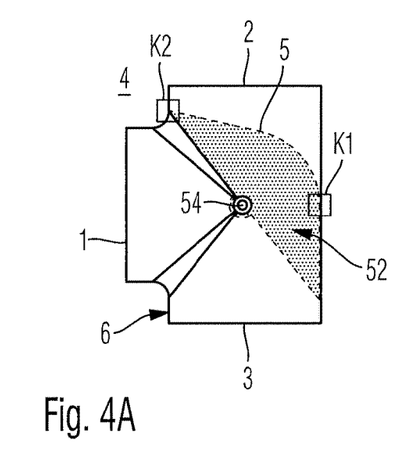
FIG. 4A is a schematic top view showing a three-way flap valve, with the walls of the three-way flap valve body illustrated transparently.
Figure 4B:
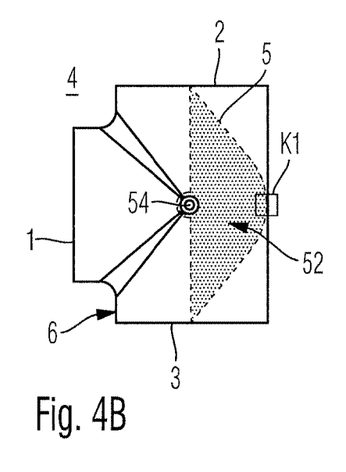
FIG. 4B is a schematic top view showing the three-way flap valve of FIG. 4A, with the walls of the three-way flap valve body illustrated transparently.
Figure 4C:
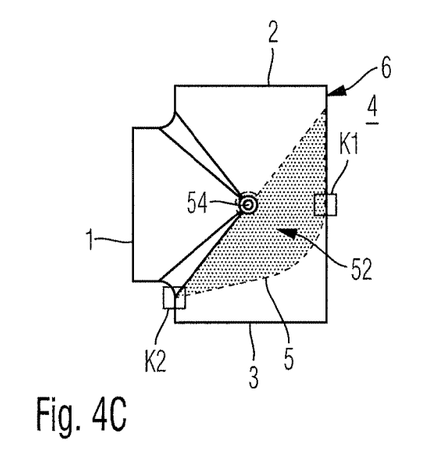
FIG. 4C is a schematic top view showing the three-way flap valve of FIG. 4A, with the walls of the three-way flap valve body illustrated transparently.

Options for sealing the valve flap 5 against an inside wall of the valve body 6 are schematically illustrated in FIGS. 4A, 4B, and 4C. FIGS. 4A to 4C hereby each show a top view of the three-way flap valve 4, with the walls of the valve body 6 being shown transparently. In the different FIGS. 4A, 4B, and 4C, the valve flap 5 is shown in three different pivotational positions.

In FIG. 4A, the valve flap 5 is oriented to provide a fluid communication between the inlet 1 and the second outlet 3. In this case, the valve flap 5 contacts the inside wall of the valve body 6 at the positions K1 and K2, thereby sealing against the valve body 6.

In FIG. 4B, the valve flap 5 is oriented to provide a fluid communication between the inlet 1 and both, the first outlet 2 and the second outlet 3. In this position, the valve flap 5 contacts the inside wall of the valve body 6 only in the position K1.

In FIG. 4C, the valve flap 5 is oriented to provide a fluid communication between the inlet 1 and the first outlet 2. In this position, the valve flap 5 contacts the inside wall of the valve body 6 at the positions K1 and K2, thereby sealing against the valve body 6.

Figure 5A:
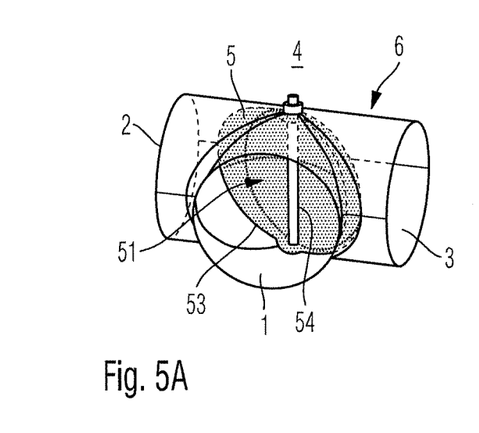
FIG. 5A is a schematic perspective view showing a three-way flap valve according to a fourth embodiment, with the walls of the three-way flap valve body illustrated transparently.
Figure 5B:
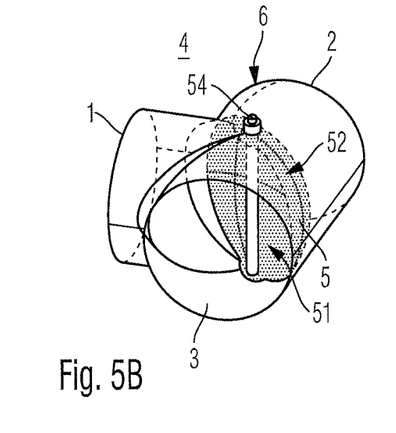
FIG. 5B is a schematic perspective view showing a three-way flap valve according to the fourth embodiment, with the walls of the three-way flap valve body illustrated transparently.
Figure 5C:
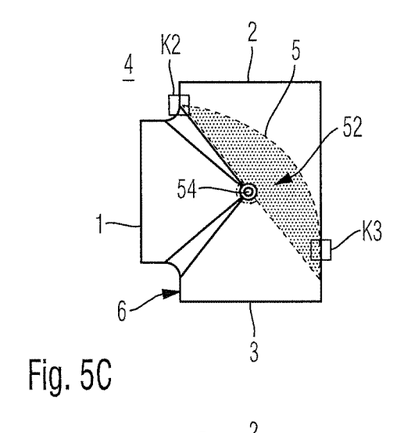
FIG. 5C is a schematic top view showing a three-way flap valve according to the fourth embodiment, with the walls of the three-way flap valve body illustrated transparently.

Referencing FIGS. 5A, 5B, and 5C, a fourth embodiment of the three-way flap valve 4 is described below. To avoid any repetition, reference is made to the explanations of the above embodiments, and for the rest only differences are addressed.

Different to the above embodiments, in the fourth embodiment, the curvature of the valve flap 5 in the first surface section A1 is chosen with a considerably larger radius of curvature such that the valve flap 5 contacts the inside wall of the valve body 6 with its two end sections K2 and K3 only in its extreme position. Accordingly, the valve flap 5 does not contact an inside wall of the valve body 6 with an intermediate section K1 in any operating position as is the case in the first to third embodiments described above. This allows higher manufacturing tolerances with respect to an adjustment of the valve flap 5 to the valve body 6. Furthermore, the ease of movement is improved.

Figure 6A:
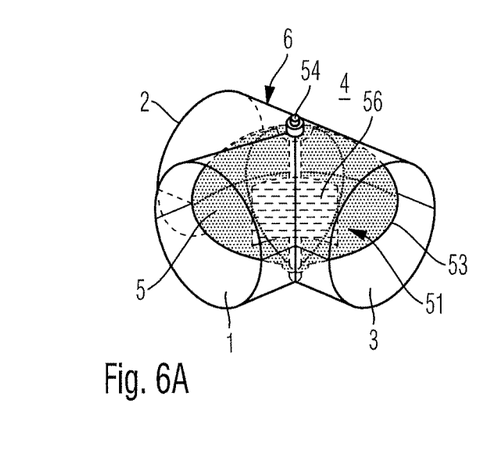
FIG. 6A is a schematic perspective view showing a three-way flap valve according to a fifth embodiment, with the walls of the three-way flap valve body illustrated transparently.
Figure 6B:
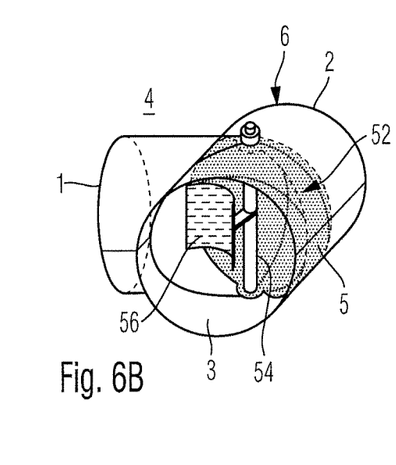
FIG. 6B is a schematic perspective view showing a three-way flap valve according to the fifth embodiment, with the walls of the three-way flap valve body illustrated transparently.
Figure 6C:
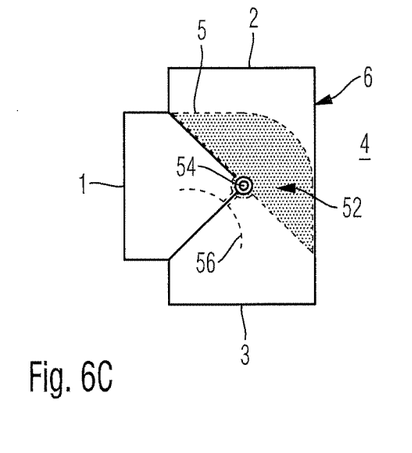
FIG. 6C is a schematic top view showing a three-way flap valve according to the fifth embodiment, with the walls of the three-way flap valve body illustrated transparently.

In the following, a fifth embodiment of a three-way flap valve 4 is described referencing FIGS. 6A, 6B, and 6C. To avoid any repetition, reference is made to the explanations of the first embodiment, and for the rest only differences are addressed.

The three-way flap valve 4 according to the fifth embodiment differs from the three-way flap valve 4 according to the first embodiment in that the pivot axis 54 passing straight through the valve body 6 supports a curved baffle plate 56. The baffle plate 56 is thus pivoted together with the valve flap 5. The curvature of the baffle plate 56 is hereby adjusted to the curvature of the valve flap 5. Consequently, the surface of the baffle plate 56 facing towards the inlet 1 is curved concavely and corresponds to an inner surface of a spherical segment.

The baffle plate guides a portion of the exhaust flow guided by the three-way flap valve such that not all of the exhaust flow is on the valve flap 5. The baffle plate may also reduce turbulence in the exhaust flow.

In the following, an advanced configuration of the valve body is described referencing FIGS. 7A and 7B, which can optionally be used in the first, second, or third embodiments described above.

Figure 7A:
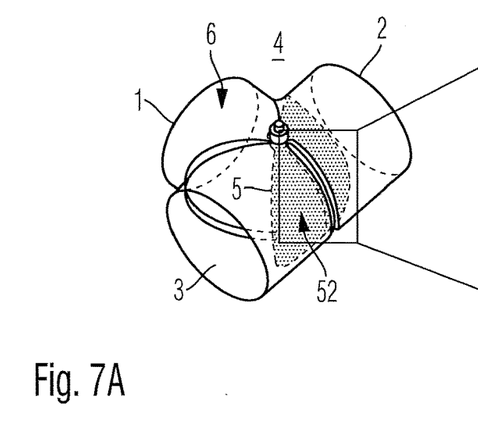
FIG. 7A is a schematic perspective view showing a three-way flap valve, with the walls of the three-way flap valve body illustrated transparently.
Figure 7B:
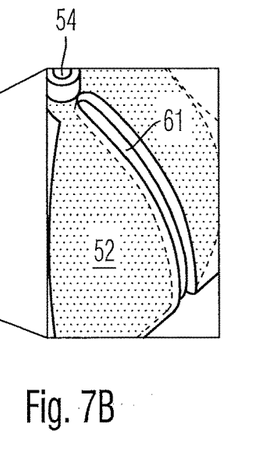
FIG. 7B is a schematic perspective detail view showing the three-way flap valve of a section of FIG. 7A enlarged, with the walls of the three-way flap valve body illustrated transparently.

FIG. 7A hereby illustrates the three-way flap valve 4 in a perspective view, with the walls of the valve body 6 shown transparently, and FIG. 7B shows an enlarged detail of FIG. 7A.

As apparent from FIG. 7B in particular, a protrusion 61 is inserted in the wall of the valve body 6 in a region located with respect to the pivot axis 54 opposite the inlet 1, the protrusion 61 being oriented towards the inlet 1 and extending parallel to the pivot axis 54.

In this way it is possible to limit an abutting of the valve flap 5 within the region K1 shown in FIGS. 4A to 4C onto a defined region. Around the protrusion, the inside wall of the valve body may furthermore be appropriately coated, for example with rubber.

Referencing FIGS. 8A and 8B, an alternative configuration of the valve flap 5 is described below that may optionally be used with the first, second, and third embodiments described above.

Figure 8A:
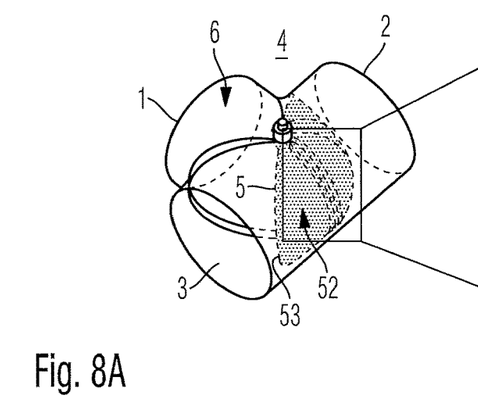
FIG. 8A is a schematic perspective view showing a three-way flap valve, with the walls of the three-way flap valve body illustrated transparently.
Figure 8B:
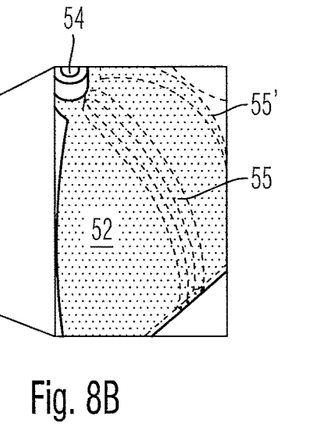
FIG. 8B is a schematic perspective detail view showing the three-way flap valve of a section of FIG. 8A enlarged, with the walls of the three-way flap valve body illustrated transparently.

FIG. 8A hereby illustrates the three-way flap valve 4 in a perspective view, with the wall of the valve body 6 shown transparently, and FIG. 8B shows an enlarged detail of FIG. 8A.

As is particularly apparent from FIG. 8B, the valve flap 5 comprises, on a second surface 52 circumscribed by the outer edge 53 and facing away from the inlet 1, two protrusions 55, 55' adapted to contact an inside wall of the valve body 6. In this way, an abutting of the valve flap 5 onto the inside wall of the valve body can be limited to the intermediate region K1 shown in FIGS. 4A to 4C. Moreover, a respective abutting only occurs in the extreme positions of the valve flap 5. Also in this case, the protrusions 55, 55' may comprise a coating.

Figure 9A:
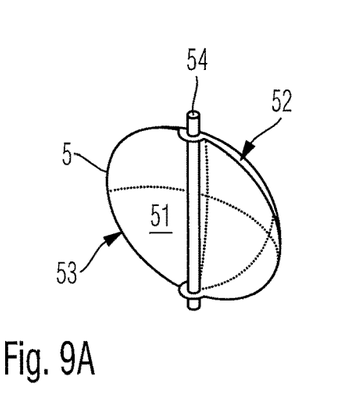
FIG. 9A is a schematic perspective view showing one of two alternatively supported valve flaps adapted for being used in any of the above embodiments.
Figure 9B:
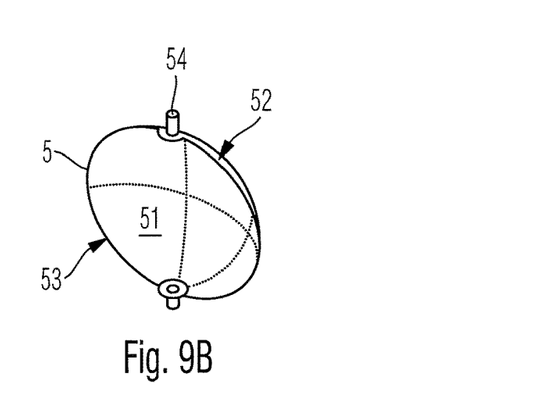
FIG. 9B is a schematic perspective view showing another of the two alternatively supported valve flaps adapted for being used in any of the above embodiments.

FIGS. 9A and 9B illustrate two alternative embodiments of the valve flap 5 that may be used in one of the embodiments described above.

FIG. 9A hereby shows a perspective view of the valve flap 5 comprising a continuous pivot axis 54 extending straight.

In contrast to this, FIG. 9B shows a perspective view of a valve flap 5 having a two-part pivot axis 54. Using this configuration of the valve flap with the fifth embodiment, the baffle plate is to be supported by the valve flap itself. Consequently, the pivot axis 54 of FIG. 9B does not extend straight through the valve body, thereby reducing the flow resistance.

Figure 10A:
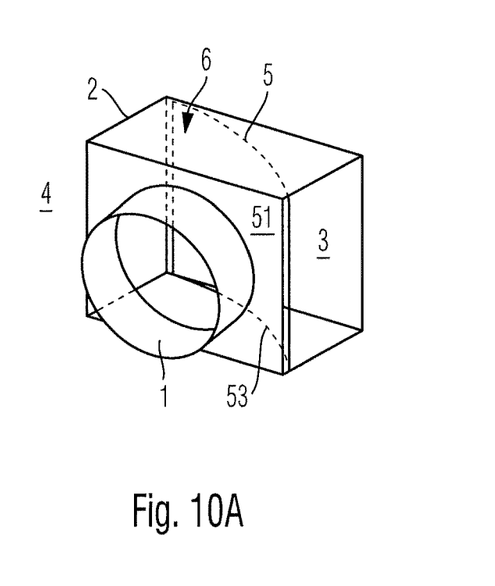
FIG. 10A is a schematic perspective view showing a three-way flap valve according to a sixth embodiment, with the valve flap having one of different pivoting positions, and the walls of the three-way flap valve body being illustrated transparently.
Figure 10B:
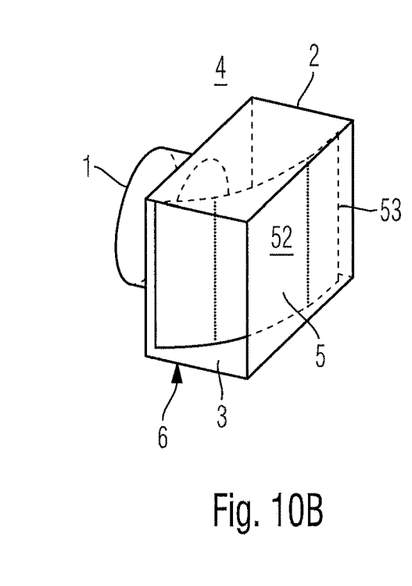
FIG. 10B is a schematic perspective view showing a three-way flap valve according to the sixth embodiment, with the valve flap having another of different pivoting positions, and the walls of the three-way flap valve body being illustrated transparently.

Referencing FIGS. 10A, 10B, and 10C, a further embodiment of a three-way flap valve 4 is described below. FIGS. 10A and 10B hereby show the three-way flap valve 4 in different perspective views, while FIG. 1C shows a top view of the three-way flap valve 4, whereby the wall of the valve body 6 is shown transparently and the valve flap 5 takes in different pivotational positions. The transparency is recognizable by the dashed line of the valve flap 5.

Figure 10C:
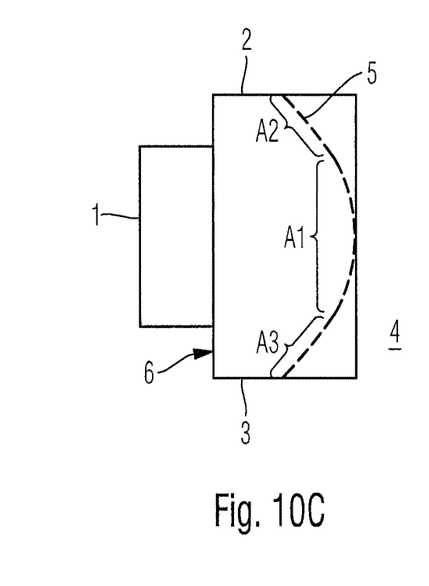
FIG. 10C is a schematic top view showing a three-way flap valve according to the sixth embodiment, with the valve flap having another of different pivoting positions, and the walls of the three-way flap valve body being illustrated transparently.

Different to the above embodiments, the valve body 6 in the embodiment shown in FIGS. 10A, 10B, and 10C is not composed of pipes. The valve body 6 rather encloses a cuboidal internal volume, with a pipe being joined into a sidewall of the valve body 6 for providing the inlet 1. The inlet 1 may alternatively also be of rectangular shape.

The valve flap 5 shown in different positions in FIGS. 10A to 10C comprises a first surface 51 circumscribed by an outer edge 53 and facing towards the inlet 1, the first surface 51 corresponding to an inner side surface of a cylinder segment in a central surface section A1. Since the material thickness of the valve flap 5 is constant also in this embodiment, this is also true for the second surface 52 facing away from the inlet 1. The valve flap 5 of the embodiment shown has no curvature in the second and third surface sections A2, A3 adjacent to the first surface section A1. Also in this case, the first surface section A1 is located between the second and the third surface section A2, A3.

Different to the above embodiments, the valve flap 5 is not supported by a pivot axis, but guided in arched guide grooves formed into an upper and a lower wall of the valve body 6. Respective guide grooves are known and therefore not illustrated. The valve flap 5 is driven from outside by a drive wheel that is also not shown.

Alternatively, this embodiment also allows to support the valve flap 5 with a pivot axis. In this case, the spacing between the pivot axis and the valve flap 5 is spanned by pivot arms.

Figure 11A:
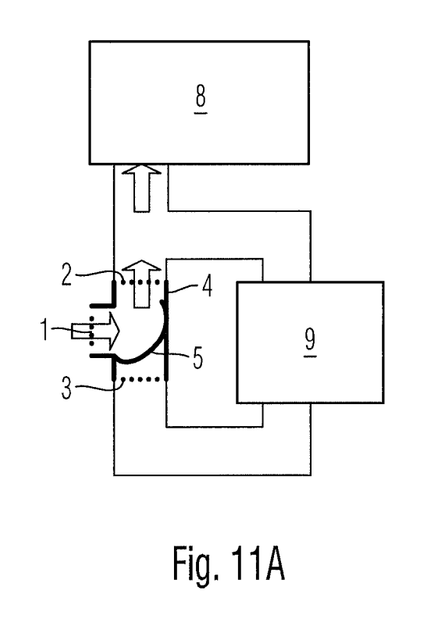
FIG. 11A is a schematic block diagram of a section of an exhaust system of a vehicle in one of different operating conditions that uses the three-way flap valve according to one of the above embodiments.
Figure 11B:
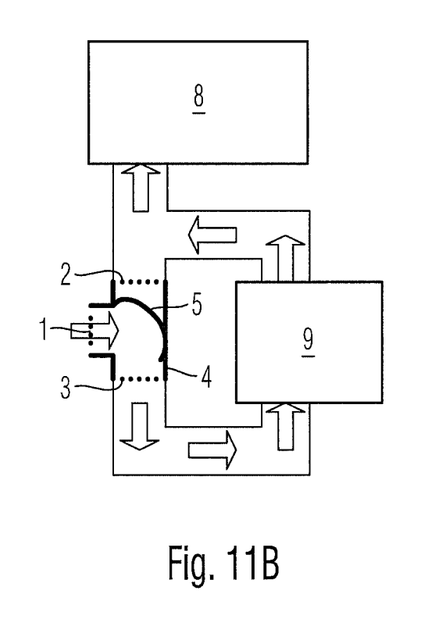
FIG. 11B is a schematic block diagram of a section of an exhaust system of a vehicle in another of different operating conditions that uses the three-way flap valve according to one of the above embodiments.
Figure 11C:
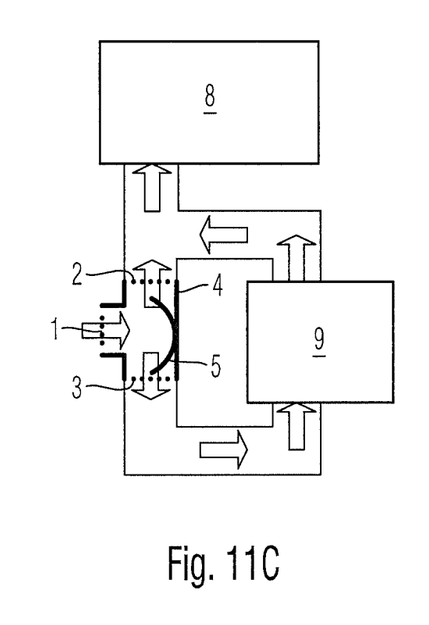
FIG. 11C is a schematic block diagram of a section of an exhaust system of a vehicle in another of different operating conditions that uses the three-way flap valve according to one of the above embodiments.

Below, a possible use of the above three-way flap valve 4 in an exhaust system of a motor vehicle is described referencing FIGS. 11A to 11C. In FIGS. 11A to 11C, the arrows indicate the direction of flow of exhaust gas passing schematically.

As schematically shown in FIG. 11A, in a first position of the valve flap 5, exhaust gas supplied through the inlet 1 of the three-way flap valve 4 is output through the first outlet 2 and directly passed on to a first component 8, such as a muffler of an exhaust system.

In a second position of the valve flap 5 of the three-way flap valve 4, exhaust gas supplied through the inlet 1 can be passed on to the first component 8 via an auxiliary component 9, such as a heat exchanger or a heat accumulator, as shown in FIG. 11B. For this purpose, exhaust gas supplied through the inlet 1 is only output through the second outlet 3 of the three-way flap valve 4.

Finally, exhaust gas supplied through the inlet 1 may in a third position of the valve flap 5 be output simultaneously through the first and second outlets 2, 3 of the three-way flap valve 4, resulting in a part of the exhaust gas supplied through the inlet 1 being passed on to the muffler 8 directly and another part via the auxiliary component 9.

Figure 12:
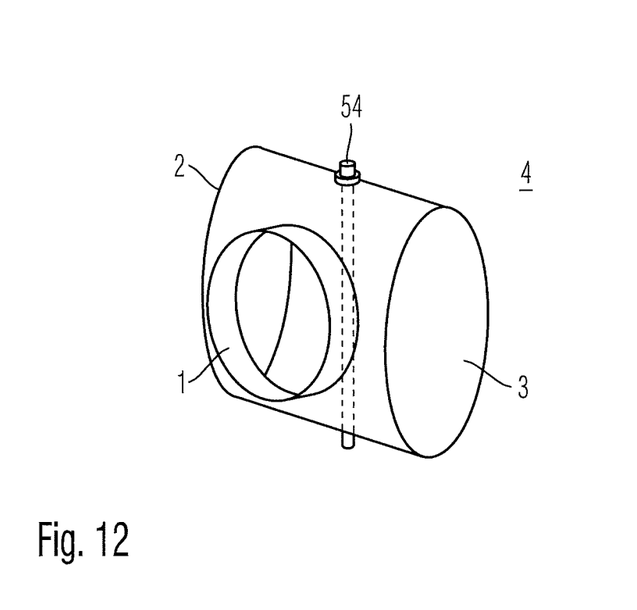
FIG. 12 is a schematic perspective view showing a three-way flap valve according to a seventh embodiment.

The three-way flap valve 4 according to the seventh embodiment shown in FIG. 12 differs from the three-way flap valve 4 according to the first embodiment only in that the first pipe extending straight between the first outlet 2 and the second outlet 3 has an oval cross-section instead of a circular cross-section, and in that the second pipe joined to the first pipe and defining the inlet 1 has a circular cross-section. The shape of the valve flap that is not visible in FIG. 12 is adapted to the cross-section of the first pipe.

While the above embodiments of the present invention have been described by way of example only, it is apparent to those skilled in the art that numerous modifications, additions and substitutions can be made without departing from the scope and gist of the invention disclosed in the following claims. While specific embodiments of the invention have been shown and described in detail to illustrate the application of the principles of the invention, it will be understood that the invention may be embodied otherwise without departing from such principles.

What is claimed is:

1. A three-way flap valve comprising:
an inlet;
a first outlet;
a second outlet; and
a valve flap moveable between at least a first position and a second position, with fluid flowing in through the inlet being directed to the first outlet with the valve flap in the first position, and fluid flowing in through the inlet being directed to the second outlet with the valve flap in the second position, wherein a surface of the valve flap, circumscribed by an outer edge, comprises at least one first surface section with a curvature;
wherein the valve flap comprises a second surface section and a third surface section;
wherein the first surface section is located between the second surface section and the third surface section;
wherein the valve flap comprises a curvature in the second and third surface section that differs from the curvature in the first surface section; and
wherein the valve flap is shaped as a spherical segment in the first surface section, and shaped as a truncated cone segment in the second and third surface sections;
wherein a valve body forms the inlet and the first outlet and the second outlet;
wherein the valve flap is located inside the valve body;
wherein a pivot pin passes straight through the valve body and rotatably connects the valve flap to the valve body;
wherein a curved baffle plate is supported by the pivot pin.

2. A three-way flap valve according to claim 1, wherein:
an inner surface of the valve flap circumscribed by the outer edge and facing towards the inlet is concave in at least the first surface section.

3. A three-way flap valve according to claim 2, wherein:
the valve flap comprises an outer surface circumscribed by the outer edge and facing away from the inlet; and
the outer surface is spaced apart from the inner surface and is convex in at least the first surface section.

4. A three-way valve according to claim 1, wherein the curvature of the valve flap has, at least in the first surface section, a radius of curvature smaller than 1.00 m.

5. A three-way flap valve according to claim 1, wherein:
the valve flap is adapted for rotation around a pivot axis; and
the first surface section extends around a first angle of between 50° and 130° with respect to the pivot axis;
the second and third surface sections each extend around a second angle equal to half of the difference between 180° and the first angle.

6. A three-way flap valve according to claim 1, wherein:
the curved baffle plate comprises a concave surface facing towards the inlet.

7. A three-way flap valve according to claim 1, wherein the valve flap comprises at least one protrusion on an outer surface circumscribed by the outer edge and facing away from the inlet.

8. A three-way flap valve according to claim 1, wherein the valve body comprises, on a valve body inside wall opposite the inlet, a protrusion oriented towards the inlet and extending along a pivot axis enabling a pivoting movement of the valve flap.

9. A three-way valve comprising:
a valve body with a first fluid passage, a second fluid passage and a third fluid passage; and
a valve flap moveable between at least a first position connecting the first fluid passage and the second fluid passage and a second position connecting the first fluid passage and the third fluid passage, wherein a surface of the valve flap, circumscribed by an outer edge, comprises at least one curved surface section;
wherein the valve flap comprises a first surface section, a second surface section and a third surface section;
wherein the first surface section is located between the second surface section and the third surface section;
wherein the valve flap comprises a curvature in the second and third surface section that differs from the curvature in the first surface section;
wherein the valve flap is shaped as a spherical segment in the first surface section, and shaped as a truncated cone segment in the second and third surface sections;
wherein the valve flap is located inside the valve body;
wherein a pivot pin passes straight through the valve body and rotatably connects the valve flap to the valve body;
wherein a curved baffle plate is supported by the pivot pin.

10. A three-way valve according to claim 9, wherein:
the first fluid passage is an inlet;
the second fluid passage is a first outlet;
the third fluid passage is a second outlet; and
the curved surface section extends away from inlet and toward the second outlet with the valve flap in the first position and the curved surface section extends away from inlet and toward the first outlet with the valve flap in the second position.

11. A three-way valve according to claim 10, wherein the curvature of the valve flap has, at least in the first surface section, a radius of curvature smaller than 1.00 m.

12. A three-way valve in accordance with claim 9, wherein:
said second and third surface sections have a radius of curvature extending only around a single axis.

13. A three-way valve in accordance with claim 9, wherein:
the valve flap is adapted for rotation around a pivot axis;
the second and third surface sections extend around the pivot axis at an angle of 48°
the first surface section extends around the pivot axis at an angle of 90°.

14. A three-way valve comprising:
a valve body defining a first fluid passage, a second fluid passage and a third fluid passage; and
a valve flap moveably arranged inside said valve body between a first position and a second position, said first position arranging said valve flap to connect said first fluid passage and said second fluid passage, said second position arranging said valve flap to connect said first fluid passage and said third fluid passage, said valve flap comprises a first surface section, a second surface section and a third surface section, said first surface section being arranged between said second surface section and said third surface section, said first surface section having a shape of a portion of a sphere, said second and third surface sections having a radius of curvature extending only around a single axis;
a pivot pin passing straight through said valve body and rotatably connecting said valve flap to said valve body about a pivot axis;
a curved baffle plate mounted on said pivot pin and movable with said valve flap.

15. A three-way valve in accordance with claim 14, wherein:
said valve body has a T shape with a leg of said T shape defining said first fluid passage, and arms of said T shape defining said second and third fluid passages;
said curved baffle plate being shaped and mounted to guide a fluid from said first fluid passage to said second fluid passage in said first position of said valve flap, said curved baffle plate being shaped and mounted to guide a fluid from said first fluid passage to said third fluid passage in said second position of said valve flap.

16. A three-way valve in accordance with claim 15, wherein:
said curved baffle plate and said valve flap being mounted on diametrically opposite sides of said pivot pin.

17. A three-way valve in accordance with claim 14, wherein:
said second and third surface sections are shaped as a truncated cone.

18. A three-way valve in accordance with claim 15, wherein:
said second and third surface sections extend around the pivot axis at an angle between 48° and 52°;
said first surface section extends around the pivot axis between 76° and 90°.

19. A three-way valve in accordance with claim 15, wherein:
said second and third surface sections extend around the pivot axis at an angle of 52°;
said first surface section extends around the pivot axis at an angle of 76°.

20. A three-way valve in accordance with claim 15, wherein:
said second and third surface sections extend around the pivot axis at an angle of 48°
said first surface section extends around the pivot axis at an angle of 90°.

* * * * *